United States Patent Office 3,354,179
Patented Nov. 21, 1967

3,354,179
PREPARATION OF OCTACHLOROTHIOLANE
Edmond R. Osgood, Painesville, Ohio, Lawrence E. Limpel, Yonkers, N.Y., Roger L. Annis, Mentor, Ohio, and Nathan J. Turner, Yonkers, N.Y., assignors to Diamond Alkali Company, Cleveland, Ohio, a corporation of Delaware
No Drawing. Filed Nov. 20, 1964, Ser. No. 412,864
8 Claims. (Cl. 260—332.5)

ABSTRACT OF THE DISCLOSURE

Octachlorothiolane is prepared by (1) reacting hexachlorobutadiene with sulfur to form tetrachlorothiophene with sulfur chlorides being removed as they are formed; (2) removing unreacted sulfur by converting it to sulfur chloride; and (3) chlorinating the tetrachlorothiophene under superatmospheric pressure in the presence of a small amount of iodine or iodine source. Octachlorothiolane is an effective fungicide particularly against fungus organisms which may be present in the soil.

---

This invention relates to biologically active compositions of matter, and more specifically to a new and improved fungicide and a method for its preparation.

The destruction of fungus organisms which are harmful to plants is one of the most critical problems facing the agricultural community, particularly in view of the fact that the constantly increasing population requires increased production of food. Harmful parasitic fungi may attack plants in two ways: Some of them infest and destroy the foliage and above-ground portions of the plant, whereas others infest the soil and invade and damage the roots and stems. It is not generally true that fungicides effective against foliage-infesting organisms are effective against soil-infesting ones, and vice versa. Thus, the search for effective soil fungicides proceeds independent of the existence of a number of foliage fungicides.

A principal object of the present invention, therefore, is to provide a new and improved soil fungicide.

A further object is to provide a soil fungicide which is selective against certain fungus organisms.

A third object is to provide a novel method for preparing fungicidal compounds.

Other objects and advantages of the invention will in part be obvious and will in part appear hereinafter.

It has been discovered that compounds of the formula

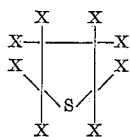

wherein X is halogen, are excellent soil funcigides. In particular, these compounds are notably effective against the fungus organisms *Rhizoctonia solani* and *Sclerotium rolfsii*.

Although this invention is intended to include all compounds covered by the above generic formula, the most inexpensive and readily available of these compounds is octachlorothiolane; this compound is preferred and the remainder of the specification will deal primarily with it. However, the other compounds represented by the generic formula are to be considered equivalents.

Octachlorothiolane is a known compound and has been prepared by a number of methods. Thus, U.S. Patent 2,504,068 describes its preparation from thiophene by chlorination in the presence of at least one mole of iodine or "iodine chloride" ($ICl_3$) per mole of thiophene. U.S. Patent 2,746,974 discloses that thiophene or partially chlorinated thiophenes may be converted to octachlorothiolane by chlorination at 40–180° C. in the presence of less than one mole of iodine per mole of thiophene; however, yields are very low if less than about 0.1 mole of iodine per mole of thiophene or substituted thiophene is used.

Octachlorothiolane may also be prepared by a two-step reaction which does not utilize a thiophene compound as a starting material. The first step is the sulfurization of hexachlorobutadiene according to the method described in U.S. Patent 2,900,394; the principal products of this reaction are tetrachlorothiophene and sulfur chlorides, particularly sulfur monochloride ($S_2Cl_2$). The thiophene is then chlorinated by either of the methods discussed hereinabove to produce octachlorothiolane. This reaction sequence is, however, expensive and inconvenient for four reasons. First, sulfurization of hexachlorobutadiene takes an inordinately long time—often 50 hours or more. Second, sulfurization affords a product contaminated with a significant quantity of tar. Third, as pointed out hereinabove, the subsequent chlorination of the tetrachlorothiophene requires the use of a significant quantity of iodine for good yields—at least 0.1 mole and preferably as much as one mole of iodine per mole of tetrachlorothiophene; that is, an amount of iodine between 11% and 110% of the weight of tetrachlorothiophene must be used in the reaction. Fourth, large quantities of corrosive iodine chlorides must be handled and disposed of. The method of the present invention eliminates all of these disadvantages.

It has been discovered that the percentage of tar produced in the sulfurization of hexachlorobutadiene is significantly reduced if the product mixture is subsequently chlorinated. It has further been discovered that the amount of iodine used in the chlorination of tetrachlorothiophene can be decreased to a catalytic quantity if the reaction is carried out under pressure. Moreover, under pressure the reaction may be carried out at a temperature as low as about 70° C.

In accordance with these findings, the present invention includes a method for the preparation of octachlorothiolane which comprises: (A) preparing tetrachlorothiophene by reacting hexachlorobutadiene with sulfur at a temperature of about 140–240° C., and removing sulfur chlorides by distillation as they are formed during the reaction; (B) chlorinating the reaction mixture from step (A) at a temperature of about 50–200° C. to convert unreacted sulfur to sulfur chlorides and thus minimize tar formation; and (C) chlorinating said tetrachlorothiophene at a pressure of about 100–200 p.s.i.g. and a temperature of about 70–100° C., in the presence of about 1–2% by weight, based on the weight of tetrachlorothiophene, of a catalyst selected from the group consisting of iodine, iodine halides and compounds which liberate iodine.

The reactions involved in this method may be represented by the following chemical equations.

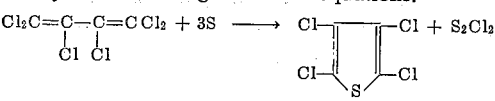

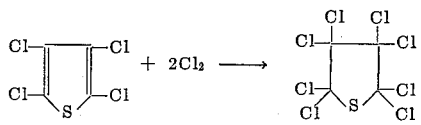

In the reaction of sulfur with hexachlorobutadiene as described in U.S. Patent 2,900,394, a substantial amount of unreacted sulfur apparently remains after formation of sulfur chlorides has ceased. This unreacted sulfur then participates in side reactions leading to the formation of tarry materials containing free and combined sulfur. The result is a decrease in the yield of tetrachlorothiophene as well as a more difficult product recovery. By chlorinating the reaction mixture after the initial evolution of sulfur chlorides has been completed, excess sulfur is disposed of by conversion to sulfur monochloride and is therefore made unavailable for by-product formation. The result is a significant decrease in the amount of tar formed in the reaction and a concomitant increase in the yield of tetrachlorothiophene.

Two preferred methods exist for the sulfurization of hexachlorobutadiene in the first step of the method of this invention. According to the first of these, hexachlorobutadiene is heated at about 140–180° C. with an equimolar amount of sulfur. The reaction is preferably carried out in the absence of solvent, but an inert solvent with the proper boiling range may be employed if desired. Additional sulfur is added during the reaction until the total amount is equal to 3 moles per mole of hexachlorobutadiene. Sulfur chlorides formed during the reaction are removed by distillation. When the evolution of sulfur chlorides has ceased, chlorine is passed into the mixture at a temperature between about 50° and 200° C. until all the unreacted sulfur has been converted to sulfur chlorides. Evolution of sulfur chlorides is an indicator by which the progress of the reaction may be measured. When no more sulfur chlorides are formed, the reaction is complete and chlorine addition may be stopped. If the chlorination temperature is below 135° C., the reaction is complete when the sulfur chloride evolved is sulfur dichloride (B.P. 60° C.). Sulfur dichloride, which is formed by the reaction of chlorine with sulfur monochloride, passes over at a much lower temperature than that of the monochloride.

In the second preferred method of carrying out the sulfurization step, the entire amount of sulfur (3 moles per mole of hexachlorobutadiene) is added at the beginning of the reaction. A somewhat higher reaction temperature, up to about 240° C., and preferably about 220–240° C., is then used. It may occasionally be desirable to run the reaction at a superatmospheric pressure in order to permit the use of a temperature in the preferred range.

After sulfurization and chlorination of the reaction mixture have been completed and sulfur chlorides have been removed, the mixture may be flash-distilled to separate the product tetrachlorothiophene from the impurities in the reaction flask. The tetrachlorothiophene may then be separated from unreacted hexachlorobutadiene by distillation or the like. Often no separation is necessary, since the hexachlorobutadiene frequently amounts to 5% or less of the product.

For the chlorination of tetrachlorothiophene to octachlorothiolane, it has previously been necessary to employ a large quantity of iodine or an iodine-chlorine compound. According to the present invention, however, the chlorination reaction is carried out under pressure and only a catalytic amount of iodine is required. In the preferred procedure, tetrachlorothiophene is charged to a pressure vessel and an amount of iodine (or if desired, an iodine halide or a compound which liberates iodine) equal to about 0.05–3%, preferably 1–2%, by weight of the tetrachlorothiophene is added. Desirably, an inert solvent such as a halogenated aliphatic hydrocarbon (e.g., chloroform, carbon tetrachloride or a chlorinated ethane) is also added. The pressure vessel is then charged with chlorine to a total pressure of about 100 to 200 p.s.i.g. and is heated to about 70° to 90° C. The mixture is stirred under pressure until the reaction is complete as determined by infrared analysis of a portion of the reaction mixture. Isolation of octachlorothiolane may then be effected by the method described in U.S. Patent 2,504,068. Preferably, however, the solvent is removed by distillation under reduced pressure and the remaining product is purified or used directly. Its purity depends in large part on the purity of the starting tetrachlorothiophene. If the starting material is at least 95% pure, the product will be at least 90% octachlorothiolane and will be a solid. A purer product may be obtained by slurrying the reaction mixture with methanol to dissolve unreacted tetrachlorothiophene, collecting the solids on a filter and drying them at a temperature between about 60° and 80° C. The purity of the product thus obtained will be 95% or greater.

As has been pointed out hereinabove, the compounds of this invention are excellent soil fungicides and are selective toward certain fungus organisms, notably *Rhizoctonia solani* and *Sclerotium rolfsii*. They may be combined with other fungicidal materials for a wider fungicidal action; for example, if it is desired to eliminate both Rhizoctonia and Pythium (e.g., for the treatment of seed decay and damping-off fungi), the octahalothiolane may be used in combination with a soil fungicide which is specific for Pythium, such as p-dimethylaminobenzenediazo sodium sulfonate.

While it is possible to apply the fungicidal compounds of the present invention in undiluted form to the soil around the plants to be protected, it is frequently desirable to apply them in admixture with either solid or liquid inert, pesticidal adjuvants. Thus, they can be applied for example, by spraying the soil with aqueous or organic solvent dispersions of the compounds. The choice of an appropriate solvent is determined largely by the concentration of active ingredient which it is desirable to employ, the volatility required in a solvent and the cost of the solvent. Among the many suitable organic solvents which can be employed as carriers for the present fungicides, there may be mentioned hydrocarbons such as benzene, toluene, xylene, kerosene, diesel oil, fuel oil and petroleum naphtha; ketones such as acetone, methyl ethyl ketone and cyclohexanone; chlorinated hydrocarbons such as carbon tetrachloride, chloroform, trichloroethylene and perchloroethylene; esters such as ethyl acetate, amyl acetate and butyl acetate; the monoalkyl ethers (e.g., the monomethyl ethers) of ethylene or diethylene glycol; alcohols such as ethanol, isopropanol and amyl alcohol; and the like.

The compounds of this invention can also be applied along with inert solid adjuvants or carriers such as talc, pyrophyllite, Attaclay, keiselguhr, chalk, diatomaceous earth, lime, calcium carbonate, bentonite, fuller's earth, cottonseed hulls, wheat flour, soybean flour, pumice, tripoli, wood flour, walnut shell flour and lignin.

It is frequently desirable to incorporate a surface active agent in the fungicidal compositions of this invention. Such surface active agents are advantageously employed in both the solid and liquid compositions. The surface active agent can be anionic, cationic or non-ionic in character. Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters, addition products of long chain mercaptans and ethylene oxide, sodium alkylbenzenesulfonates having 14 to 18 carbon atoms, alkylphenolethylene oxides (e.g., p-isooctylphenol condensed with 10 ethylene oxide units), and soaps (e.g., sodium stearate and sodium oleate).

The solid and liquid formulations can be prepared by any suitable method. Thus, the fungicidal ingredient, in finely divided form if a solid, may be tumbled together with finely divided solid carrier. Alternatively, the fungicidal ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200-mesh Tyler sieve also is satisfactory.

For dusting purposes, preferably formulations are employed in which the active ingredient is present in an amount of 5–50% of the total by weight. However, concentrations outside this range are operative and compositions containing 1–99% of active ingredient by weight are contemplated, the remainder being carrier and/or any other additive or adjuvant material which may be desired. It is often advantageous to add small percentages of surface active agents, e.g., 0.5–1% of the total composition by weight, to dust formulations.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5–1.0% of a surface active agent by weight is included in the liquid composition. For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. In liquid formulations the active ingredient often constitutes not over 30% by weight of the total and may be 10% or even as low as 0.01%.

The compounds of the present invention may be employed in compositions containing other pesticides, more especially fungicides, insecticides and bactericides, e.g., phenothiazine, pyrethrum, rotenone, DDT, etc.

The invention is illustrative by the following examples.

EXAMPLE 1

*Preparation of tetrachlorothiophene*

A 12-liter flask is equipped with a mechanical stirrer, thermometer, fractionating column and heating mantle. The flask is charged with 7837 grams (30 moles) of hexachlorobutadiene and is heated to 160° C. with stirring. Sulfur, 960 grams (30 moles) is added and stirring is continued as the mixture is heated under reflux. The sulfur chlorides formed during the reaction are removed through the fractionating column as they are formed; the temperature at the head of the column is 135° C. Heating is continued for 24 hours, during which period four additional 480-gram (15-mole) portions of sulfur are added. Heating is stopped after the evolution of sulfur chlorides ceases.

A portion of the reaction mixture weighing 501.5 grams is treated with chlorine (280 grams) for five hours at a temperature between 60° and 156° C. When reaction is complete as evidenced by the evolution of sulfur dichloride, the mixture is flash distilled to yield 495.3 grams of a product containing 91.8% tetrachlorothiophene and 5.5% unreacted hexachlorobutadiene. This represents an overall yield of 90.6% tetrachlorothiophene.

A second portion of the original reaction mixture, weighing 537 grams, is flash distilled directly without prior treatment with chlorine. The distillate weighs 449 grams and contains 93.7% tetrachlorothiophene and 6.3% hexachlorobutadiene, an overall tetrachlorothiophene yield of 78.4%.

The amount of tar collected in the chlorinated portion of the reaction mixture is 1.8% as compared with 13.6% for the non-chlorinated portion.

EXAMPLE 2

*Preparation of tetrachlorothiophene*

A 12-liter flask, equipped as in Example 1, is charged with 7837 grams (30 moles) of hexachlorobutadiene and heated to 160° C. Sulfur, 2880 grams (90 moles), is added with stirring and the temperature of the reaction mixture is raised to 225° C. Sulfur monochloride is formed as the reaction proceeds and is removed through the fractionating column at 135–140° C. When the theoretical amount of sulfur monochloride, 4050 grams, has been removed (9½ hours), the reaction mixture is cooled to 130° C. and the fractionating column is replaced with a reflux condenser. A sparger for introducing chlorine is fitted into the flask and 500 grams of chlorine is passed into the mixture. Two hours are required for the chlorine addition. The fractionating column is then reinserted and the mixture is heated until all the sulfur chloride has been removed (435 grams) and distillation of unreacted hexachlorobutadiene begins (head temperature 215° C.). The product is flash-distilled. The distillate, boiling at 106–116° C. at 17–21 millimeters, is a clear yellow liquid containing 88.5% tetrachlorothiophene and 11.5% hexachlorobutadiene. The yield of this liquid is 6575 grams or 96%, representing an 85% yield of tetrachlorothiophene.

EXAMPLE 3

*Preparation of octachlorothiolane*

A 2.8-liter nickel autoclave is equipped with a mechanical stirrer, heating unit, temperature control, pressure gauge and dip tube. The autoclave is charged with 376 g. of 89.5% tetrachlorothiophene prepared according to Example 2 (1.52 moles), 1125 milliliters of carbon tetrachloride, and 3.3 grams of iodine. Chlorine (1320 grams) is then added to an internal pressure of 200 p.s.i.g. at 75° C. The mixture is stirred at this temperature for 24 hours and samples are periodically removed and checked by infrared analysis to determine the octachlorothiolane content. At the end of 14 hours, the reaction is complete.

The mixture is cooled and the excess chlorine is vented to a caustic scrubber. Nitrogen gas is passed through to purge the reactor of the remaining chlorine. The reaction mixture is transferred to a flask and the carbon tetrachloride is removed by vacuum evaporation. Methanol, 275 grams, is added at a temperature of 40–50° C. and the mixture is stirred and cooled to 10° C. The solid product is removed by filtration, washed with cold methanol and oven-dried at 60° C. The yield of octachlorothiolane is about 80%.

EXAMPLE 4

*Fungicidal activity—Cucumber seed decay and damping-off (Rhizoctonia solani)*

The following procedure is used to evaluate octachlorothiolane as a soil fungicide against the organism *Rhizoctonia solani*. Test results are also reported for several other compounds which are known to be effective foilage fungicides.

Air dry sterile soil is infested with *Rhizoctonia solani*. The soil is placed in plastic pods and 25 cucumber seeds are placed on the surface. Half of the appropriate amount of test formulation to give the desired rate of application is poured over the exposed seeds which are then covered with infested soil. After the seeds are covered, the other half of the chemical formulation is poured onto the surface. The test formulation contains 0.1 gram (0.1 ml. if a liquid) of the test compound, 2 ml. of acetone, 1 ml. of stock emulsifier solution (0.5% Triton X–155 in water by volume) and 94 ml. of distilled water. The concentration of toxicant in this formulation is 500 parts per million and 50 ml. of the formulation is equivalent to a dosage of 64 pounds per acre of the active compound on a broadcast basis. A non-inoculated treated control is also run to determine the phytotoxicity of each test compound. The pots are then transferred to the greenhouse. Effectiveness of the test chemical is determined by the percentage of plants growing 14 days after treatment and planting. The following table gives results obtained in this test.

| Compound Tested | Concentration, lbs./acre | Percent Stand | |
|---|---|---|---|
| | | Non-inoculated | Inoculated |
| Octachlorothiolane | 64 | 100 | 100 |
| | 32 | 100 | 100 |
| | 16 | 100 | 100 |
| | 10 | 100 | 90 |
| | 8 | 100 | 68 |
| | 5 | 100 | 44 |
| N-Trichloromethyl-mercapto-4-cyclohexene-1,2-dicarboximide | 10 | 100 | 26 |
| | 5 | 100 | 14 |
| N-Dodecylguanidine acetate | 10 | 100 | 0 |
| | 5 | 100 | 0 |
| Manganese ethylenebis-dithiocarbamate | 10 | 100 | 22 |
| | 5 | 100 | 12 |

The above results show that octachlorothiolane is virtually completely effective as a soil fungicide at concentrations as low as 10 lbs. per acre, and is appreciably effective even below that concentration. By contrast, three compounds which are known to be effective foliage fungicides have little or not activity as soil fungicides at concentrations of 10 lbs. per acre and below.

EXAMPLE 5

*Fungicidal activity—Pea seed decay and damping-off (Sclerotium rolfsii)*

The following procedure is used to test the activity of the compounds of this invention against still another fungus organism which infests soil.

Air dry sterile soil is infested with the organism *Sclerotium rolfsii*. The soil is placed in plastic pots, and 25 Perfection pea seeds are placed on the surface. The procedure of Example 4 is then followed. Effectiveness of the test chemical is determined by the percentage of plants growing 14 days after treatment and planting.

The following table shows the effectiveness of octachlorothiolane when tested by this method.

| Concentration, lbs./acre | Percent Stand | |
|---|---|---|
| | Non-inoculated | Inoculated |
| 64 | 68 | 64 |
| 32 | 100 | 60 |
| 16 | 100 | 72 |

The results of this example show that octachlorothiolane is an effective soil fungicide against Sclerotium as well as Rhizoctonia.

EXAMPLE 6

*Fungicidal activity—Pea seed decay and damping-off (Pythium)*

Air dry sterile soil is infested with the organism Pythium sp. The soil is placed in plastic pots and 25 Perfection pea seeds are placed on the surface. The procedure of Example 4 is then followed. Effectiveness of the test chemical is determined by the percentage of plants growing 19 days after treatment and planting. The following results are obtained with octachlorothiolane.

| Concentration, lbs./acre | Percent Stand | |
|---|---|---|
| | Non-inoculated | Inoculated |
| 64 | 100 | 0 |
| 32 | 100 | 0 |
| 16 | 100 | 0 |

The above results show that octachlorothiolane, although very effective against Rhizoctonia and Sclerotium species, is virtually inactive against Pythium.

EXAMPLE 7

*Fungicidal activity—Pea seed decay and damping-off (Pythium and Rhizoctonia)—Combinations of fungicides*

Soil known to be infested with seed decay and damping-off fungi is placed in suitable containers and treatment is accomplished by drenching the soil with 74.25 ml. of the test formulation, which is equivalent at full strength to 128 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in the formulation is 2000 parts per million. Lower concentrations of toxicant are obtained by diluting the formulation with distilled water. One day after treatmetnt, soil is removed from each container and thoroughly mixed in a five-pound paper bag and then replaced in the container. Three days after drenching, 25 pea seeds are planted in the treated soil in each container. From the time of treatment until the pea seeds begin to emerge, the containers are held at 20° C., in a controlled temperature cabinet. Untreated checks and a standard material are included in each test in addition to a check planted in sterilized soil. After seed emergence the container is removed to the greenhouse bench and percentage stand is recorded 14 days after planting. Using this procedure, the following results are obtained.

| Compound Tested | Concentration, lbs./acre | Percent Stand |
|---|---|---|
| Octachlorothiolane | 32 | 20 |
| p-Dimethylaminobenzenediazo sodium sulfonate | 16 | 0 |
| Octachlorotetrahydrothiophene+p-dimethylamino-benzenediazo sodium sulfonate | 32+8 | 50 |

These results show that, while octachlorothiolane and p-dimethylaminobenzenediazo sodium sulfonate alone are relatively inactive against pea seed decay and damping-off fungi (owing to the inactivity of the former against Pythium and the inactivity of the latter against Rhizoctonia), a combination of the two fungicides is active against these fungi.

EXAMPLE 8

*Fungicidal activity—Cucumber seed decay and damping-off (Pythium and Rhizoctonia)—Combinations of fungicides*

The method described in Example 7 is repeated except that the pea seeds are replaced by cucumber seeds. The following results are obtained.

| Compound Tested | Concentration, lbs./acre | Percent Stand |
|---|---|---|
| Octachlorothiolane | 16 | 18 |
| p-Dimethylaminobenzenediazo sodium sulfonate | 16 | 6 |
| Octachlorothiolane+p-dimethylaminobenzenediazo sodium sulfonate | 16+4 | 90 |

These results show the effectiveness of a combination of fungicides on cucumber seed decay and damping-off species of fungus.

EXAMPLE 9

*Fungicidal activity—Hopper box method—Protection of cotton from Rhizoctonia*

This test measures the effectiveness of the test compound in protecting cotton seeds against the effect of *Rhizoctonia solani*.

Twenty-five cotton seeds contained in a beaker are mixed with a dust of the test chemical in an amount sufficient to give the desired concentration in ounces per 1000 feet of seed row. The mixed chemical and seeds are then sprinkled into a 13-inch furrow formed in infested soil contained in a metal flat. The furrows are pinched closed and the percent stand is calculated after 19 days. Comparison is made with a non-inoculated furrow to determine the phytotoxicity of the test compounds. The following table gives the results for octachlorothiolane as compared with a known foliage fungicide.

| Compound tested | Dosage, oz./1,000 ft. of row | Percent Stand | |
|---|---|---|---|
| | | Noninculated | Inoculated |
| Octachlorothiolane | 3 | 68 | 57 |
| | 1 | 80 | 61 |
| N-trichloromethylmercapto-4-cyclohexane-1,2-dicarboximide. | 3 | | 0 |
| | 1 | | 0 |
| Octachlorothiolane+N-trichloromethylmercapto-4-cyclohexane-1,2-dicarboximide. | 3+3 | 60 | 50 |
| | 1+1 | 76 | 47 |

These results show that octachlorothiolane has appreciable activity against Rhizoctonia in the presence of cotton seeds. N-trichloromethylmercapto-4-cyclohexane-1,2-dicarboximide, on the other hand, is a known foliage fungicide but has no effect whatsoever on the soil-infesting fungus, even when combined with octachlorothiolane.

EXAMPLE 10

*Fungicidal activity—Foliage protectant and eradicant tests*

The tomato foliage disease test measures the ability of the test compound to protect tomato foliage against infection by the early blight fungus *Alternaria solani* (Ell. and Mart.) Jones and Grout. The method used employs tomato plants, 5 to 7 inches high which are 4 to 6 weeks old. Duplicate plants, one set for each test fungus, are sprayed with various dosages of the test formulation at 40 lbs. per sq. in. air pressure while being rotated on a turntable in a hood. The center of the turntable is 45 inches from the nozzle of the spray gun. The formulation containing 0.1 g. of the test compound, 4 ml. of acetone, 2 ml. of stock emulsifier solution and 94 ml. of distilled water is applied for concentrations of 1000 p.p.m. of the test chemical. Lower concentrations are obtained by employing less toxicant but maintaining the same concentrations of acetone and emulsifier in the water.

After the spray deposit is dry, treated plants and controls (sprayed with formulation less toxicant) are sprayed while being rotated on a turntable with a spore suspension containing approximately 20,000 conidia of *A. solani* per ml. The atomizer used delivers 20 ml. in the 30-second exposure period. The plants are held in a saturated atmosphere for 24 hours at 70° F. to permit spore germination and infection before removal to the greenhouse.

After two days from the start of the test, lesion counts are made on the three uppermost fully expanded leaves. The data are converted to percent disease control based on the number of lesions obtained on the control plants.

When tested by this method, octachlorothiolane gives no control whatever of early blight at a concentration of 1000 p.p.m. or lower.

Examples 4–10 show, in addition to the fungicidal activity of octachlorothiolane when used as a soil fungicide against Rhizoctonia and Sclerotium, the following facts: (1) There is no apparent correlation between activity as a soil fungicide and activity as a foliage fungicide; (2) a number of compounds which are extremely effective as foliage fungicides exert no activity at all when used as a soil fungicide; and (3) octachlorothiolane, though a powerful soil fungicide, is of no use as a foliage fungicide.

It is to be understood that the invention is not limited by the specific examples and embodiments described hereinabove, but includes such changes and modifications as may be apparent to one skilled in the art upon reading the appended claims.

What is claimed is:

1. A method for the preparation of octachlorothiolane which comprises the steps of (A) reacting hexachlorobutadiene with sulfur at a temperature of about 140–240° C., and removing sulfur chlorides by distillation as they are formed during the reaction, thus forming tetrachlorothiophene; (B) chlorinating the reaction mixture from step (A) at a temperature of about 50–200° C. to convert unreacted sulfur to sulfur chlorides and thus minimize tar formation and (C) chlorinating said tetrachlorothiophene at a pressure of about 100–200 p.s.i.g. and a temperature of about 70–90° C., in the presence of about 1–2% by weight, based on the weight of tetrachlorothiophene, of a catalyst selected from the group consisting of iodine and iodine halides.

2. The method of claim 1 wherein the catalyst used in step (C) is iodine.

3. The method of claim 2 wherein step (A) is carried out by adding the stoichiometric amount of sulfur to the hexachlorobutadiene at the beginning of the reaction period.

4. The method of claim 2 wherein step (A) is carried out by adding a portion of the sulfur at the beginning of the reaction period and adding further portions of sulfur as the reaction proceeds.

5. The method of claim 2 wherein step (C) is carried out in a halogenated aliphatic hydrocarbon solvent.

6. The method of claim 5 wherein the solvent is carbon tetrachloride.

7. In a method for the preparation of octachlorothiolane which comprises sulfurizing hexachlorobutadiene to tetrachlorothiophene and chlorinating said tetrachlorothiophene to octachlorothiolane, the improvement which comprises reacting the sulfurization mixture with chlorine at a temperature between about 50° and 200° C. to convert unreacted sulfur to sulfur monochloride and minimize tar formation, thereby increasing the yield of tetrachlorothiophene.

8. In a method for the preparation of octachlorothiolane which comprises the steps of sulfurizing hexachlorobutadiene to tetrachlorothiophene and then chlorinating said tetrachlorothiophene to octachlorothiolane, the improvement which comprises carrying out the chlorination reaction at a pressure of about 100–200 p.s.i.g. and a temperature of about 70–90° C., in the presence of about 1–2% of iodine based on the weight of said tetrachlorothiophene.

References Cited

UNITED STATES PATENTS

| 2,746,974 | 5/1956 | Inman | 260—332.5 |
| 2,939,871 | 6/1960 | Pyne | 260—332.5 |
| 2,957,801 | 10/1960 | Birum | 167—33 |
| 3,149,124 | 9/1964 | Krespan | 260—332.5 X |
| 3,171,778 | 3/1965 | Slezak | 167—33 |

WALTER A. MODANCE, *Primary Examiner.*

J. S. LEVITT, *Examiner.*

J. D. GOLDBERG, C. SHURKO, *Assistant Examiners.*